United States Patent
Shen

[15] 3,700,776
[45] Oct. 24, 1972

[54] USE OF P,P'-BIS-UREIDODIPHENYL SULFONE IN TREATING MAREK'S DISEASE
[72] Inventor: Tsung-Ying Shen, Westfield, N.J.
[73] Assignee: Merck & Co., Inc., Rahway, N.J.
[22] Filed: March 10, 1970
[21] Appl. No.: 18,293

[52] U.S. Cl. ................................................424/322
[51] Int. Cl. .............................................A61k 27/00
[58] Field of Search......................................424/322

[56] References Cited

OTHER PUBLICATIONS

Nasemann, Chem. Abst. Vol. 65 (1966) page 6127c.
Michael, Chem. Abst. Vol. 64 (1966) page 20413e.
Alexander, Chem. Abst. Vol. 64 (1966) page 20463b.

Primary Examiner—Sam Rosen
Attorney—I. Louis Wolk, J. Jerome Behan and Hesna J. Pfeiffer

[57] ABSTRACT

The use of p,p'-bis-ureidodiphenyl sulfone and soluble salts thereof in reducing mortality and decreasing lesion incidence of poultry exposed to Marek's disease and to compositions comprising the p,p'-bis-ureidodiphenyl sulfone as the active ingredient are provided.

12 Claims, No Drawings

USE OF P,P'-BIS-UREIDODIPHENYL SULFONE IN TREATING MAREK'S DISEASE

DESCRIPTION OF THE PRIOR ART p,p'-Bis-ureidodiphenyl sulfone is disclosed in Northey, *The Sulfonamides and Allied Compounds*, Reinhold, 1948, page 356, and also as part of a generic formula in U.S. Pat. No. 2,328,548 (1943). The patent discloses activity against cocci-caused infections.

SUMMARY OF THE INVENTION

The use of p,p'-bis-ureidodiphenyl sulfone is provided for the treatment and prophylaxis of Marek's disease, to prevent poultry death and sickness as well as to decrease the incidence of lymphoproliferative foci and associated inflammatory-like lesions. It also serves as a growth promotant by decreasing subclinical disease. Poultry feed compositions are provided which contain the p,p'-bis-ureidodiphenyl sulfone in low concentrations, but which are active against the disease. In addition, soluble salts of p,p'-bis-ureidodiphenyl sulfone are provided which can be dissolved in the drinking water for ease of treatment of the poultry. Molecular complexes of the compound can also be employed to enhance solubility. A feed supplement pre-mix is also provided containing the active compound p,p'-bis-ureidodiphenyl sulfone.

Marek's disease is a highly infectious lymphoproliferative disorder of poultry, especially chickens. Marek's disease has also been known as neural leukosis. The causative agent(s) are viral with a DNA-type virus implicated as an etiological factor. Marek's disease often is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are one or more of the following: lymphocytic infiltrated peripheral nerves and/or feather follicles; lymphoproliferative lesions, microscopic to several mm. in size, within any tissue of the body but principally within the liver, spleen, kidney, gonads, heart, proventriculus, breast muscle, skin, and nerves.

Marek's disease is estimated by the U.S. Department of Agriculture to cause a $200 million annual loss to the U.S. poultry industry. This loss is due to mortality and morbidity and to the rejection of slaughtered bird carcasses as being unfit for human consumption. This rejection is due to the presence of the lymphoproliferative foci.

The compound which, according to this invention, has been found to be active against Marek's disease is p,p'-bis-ureidodiphenyl sulfone. The structure of the compound is

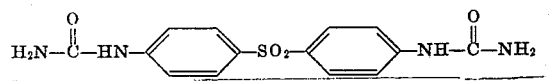

Soluble salts of this compound, such as p,p'-bis-ureidodiphenyl sulfone sodium salt or p,p'-bis-ureidodiphenyl sulfone quarternary ammonium salt can also be prepared and are useful against Marek's disease. Molecular complexes of p,p'-ureidodiphenyl sulfone with organic and inorganic complexing agents can also be used in the treatment of the disease. Preferably, the compound is employed in the free base form, although the salt or complex form can be used if desired.

The compounds of this invention may be tested for efficacy against Marek's disease in the following manner: Chickens are infected with virus-containing lymphoblasts originally obtained from a chicken with a typical case of Marek's disease. The medication can be orally or subcutaneously administered daily, either in the diet or by parenteral infection as an aqueous suspension. After an appropriate experimental period, wherein over 50 percent of the non-medicated controls succumb, all surviving birds are sacrificed. All dead and sacrificed birds are autopsied and lesion incidence recorded.

In accordance with this invention, the p,p'-bis-ureidodiphenyl sulfone is employed for controlling Marek's disease by oral administration to poultry susceptible to the disease, either in the drinking water or feed. The p,p'-bis-ureidodiphenyl sulfone can also be administered by parenteral injection.

The preferred mode of administration of the p,p'-bis-ureidodiphenyl sulfone is by dispersion in the finished feed of the animals. The medicated feed is then fed ad libitum to the birds. Good results against Marek's disease are achieved with feedstuff containing from about 0.0005 to 0.5 percent by weight of the p,p'-bis-ureidodiphenyl sulfone. The preferred range is between 0.001 to 0.01 percent in the feed. Levels in poultry feed are here expressed in terms of percent by weight concentration.

The higher levels may be used in treating an established outbreak of Marek's disease, but the higher dosages are not preferred for prophylactic treatment where medicated feed is given continuously to the poultry. It will be appreciated by those skilled in this art that the lowest levels consonant with adequate control of Marek's disease will be used in most instances in order to eliminate as far as possible any side effects that might be induced on prolonged feeding of unnecessarily high levels. The finished feed in which the above-described levels of p,p'-bis-ureidodiphenyl sulfone are employed is a nutritionally adequate one containing sources of carbohydrate, protein, fat, vitamins, minerals, and other nutritional factors commonly employed in commercial poultry raising. In addition, other poultry feed additives such as coccidiostats, e.g., Amprolium, ethopabate, nicarbazin, can be employed in the compositions. The feeds can also contain additives which potentiate the action of the p,p'-bis-ureidodiphenyl sulfone so that lower levels can be used in the feed.

In addition to administration via the solid feedstuff, the compound of the invention may be administered to poultry by incorporation in the drinking water. The preferred dose levels in the drinking water are usually somewhat less than those employed in a solid feed inasmuch as poultry drink about twice as much as they eat. The operable level in drinking water is from 0.00001 to 0.2 percent by weight of p,p'-bis-ureidodiphenyl sulfone, the preferred range is 0.0002 to 0.1 percent by weight. Administration via the drinking water is of advantage when using the compound therapeutically rather than prophylactically. For this purpose it is convenient to prepare dispersible or water-soluble powders in which the p,p'-bis-ureidodiphenyl sulfone is intimately dispersed in a suitable water-soluble or dispersible liquid or solid carrier such as dextrose, sucrose, DMSO, or other suitable non-toxic carriers, at concentrations of from about 0.03 percent to about 25 percent by weight. These solids may then be conveniently added to the drinking water by the poultry grower.

A typical drinking water formulation contains p,p'-bis-ureidodiphenyl sulfone, 0.3%; 1-(2-n-propyl-4-amino-5-pyrimidinylmethyl)-2-methyl pyridinium chloride hydrochloride, 9.6%; dextrose, 30%; propylene glycol, 20%; dimethylpolysiloxane, 0.002%; polyoxyethylene sorbitan monoleate, 0.2%; water, to 100%.

The compounds of this invention can also be administered parenterally. A sterile pharmaceutically carrier can be employed. Alternatively, an aqueous suspension or solution of the free-base form of the p,p'-bis-ureidodiphenyl sulfone, or an aqueous solution of a soluble salt of the diphenylsulfone can be used. The concentration of compound in the injection is adjusted to give the desired amount of compound per kilogram of body weight daily. Generally, 1–200 mg./kg. are operable, and 10–50 mg./kg. are preferred. The compound can also be encapsulated subcutaneously to give a sustained release of the drug over a pre-determined amount of time. The amount of compound in the implanted capsule can be adjusted according to rate of dispersion over the time period until the next implantation.

According to a further aspect of this invention, there are provided compositions comprising poultry feed supplements or additives containing the p,p'-bis-ureidodiphenyl sulfone previously described as an effective Marek's disease agent. In such compositions, the compound is mixed with or dispersed in an orally ingestible carrier vehicle that is non-toxic to the poultry and compatible with the finished feedstuff. These feed supplements contain a significantly higher percentage of p,p'-bis-ureidodiphenyl sulfone than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adequate mixing. The diphenyl sulfone described hereinabove may be formulated into feed supplement compositions containing from about 0.5 percent to about 50 percent by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0 percent to about 40 percent by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing the compound of the present invention are:

(A)

| | Lbs. |
|---|---|
| p,p'-bis-ureidodiphenyl sulfone | 1.5 |
| Amprolium | 25.0 |
| Wheat middlings | 73.5 |

(B)

| | |
|---|---|
| p,p'-bis-ureidodiphenyl sulfone | 5.0 |
| Corn gluten feed | 95.0 |

(C)

| | |
|---|---|
| p,p'-bis-ureidodiphenyl sulfone | 2.0 |
| Corn germ meal | 40.0 |
| Corn distillers' grains | 58.0 |

(D)

| | |
|---|---|
| p,p'-bis-ureidodiphenyl sulfone | 1.0 |
| Corn distillers' dried grains | 99.0 |

(E)

| | |
|---|---|
| 2,4-diamino-5-(p-chlorophenyl)-6-ethyl-pyrimidine | 0.5 |
| p,p'-bis-ureidodiphenyl sulfone | 2.0 |
| Distillers' dried grains | 97.5 |

The compound p,p'-bis-ureidodiphenyl sulfone used in this invention can be prepared using the following procedures. The starting material is p,p'-diaminodiphenyl sulfone. This starting material is treated with a molecular excess of phosgene, and the two compounds are reacted in a warm (30°–50°C.) solution of a solvent such as dioxane or dimethylsulfoxide. After removal of the solvent, the product is redissolved in a solvent such as benzene, xylene, or a suitable hydrocarbon solvent, and heated at reflux for 6–20 hours. The product obtained is p,p'-bis-isocyanatodiphenyl sulfone.

The latter compound is then reacted with an ammoniating reagent such as ammonia. The reaction preferably takes place in a solvent such as dioxane or dimethylsulfoxide. An excess of the chosen ammoniating agent is added to the solution. The temperature is 30°–60C. The product is p,p'-bis-ureidodiphenyl sulfone.

The following example describes one method of preparing the p,p'-bis-ureidodiphenyl sulfone compound.

EXAMPLE

A 95 g. portion of the p,p'-diaminodiphenyl sulfone is dissolved in 400 ml. of warm dioxane. This solution is added slowly to 350 ml. of dioxane into which phosgene gas is bubbling. Addition of phosgene is continued for 30 minutes following completion of addition of the diphenyl sulfone. After stirring an hour more, the dioxane is removed in vacuo and the residue suspended in 600 ml. of benzene. The mixture is refluxed overnight. The product of this reaction is p,p'-bis-isocyanatodiphenyl sulfone. However, this product is not isolated in the purified form, but obtained as a concentrate from the filtrate of the benzene solution. The concentrate thus obtained is suspended in 600 ml. of dioxane and warmed until dissolved. This solution is added to 500 ml. of dioxane into which ammonia gas is bubbled. The ammonia is bubbled in for 10 minutes prior to and one hour after the addition of the isocyanato sulfone solution.

A solid product is precipitated and collected. After washing and recrystallization, p,p'-bis-ureidodiphenyl sulfone, m.p. 259°–260°C., is obtained.

What is claimed is:

1. A method for combatting Marek's disease in poultry which comprises administering to poultry an effective amount of p,p'-bis-ureidodiphenyl sulfone, or a salt thereof.

2. The method of claim 1 in which the effective amount of the p,p'-bis-ureidodiphenyl sulfone is administered parenterally.

3. The method of claim 2 in which the effective amount administered parenterally on a daily basis is 1–200 mg./kg. of body weight.

4. The method of claim 2 in which the effective amount administered parenterally on a daily basis is 10–50 mg./kg. of body weight.

5. The method of claim 1 in which the effective amount of the p,p'-bis-ureidodiphenyl sulfone is administered orally.

6. The method of claim 5 in which the effective amount administered orally is 0.0005 to 0.5 percent by weight of the poultry feedstuff.

7. The method of claim 5 in which the effective amount administered orally is 0.001 to 0.01 percent by weight of the poultry feedstuff.

8. The method of claim 5 in which the effective amount administered orally is 0.00001 to 0.2 percent by weight of the poultry drinking water.

9. The method of claim 5 in which the effective amount administered orally is 0.002 to 0.1 percent by weight of the poultry drinking water.

10. A composition which comprises a poultry feedstuff having admixed therein p,p'-bis-ureidodiphenyl sulfone or a salt thereof in an amount sufficient to combat Marek's disease in poultry.

11. The composition of claim 10 in which the effective amount of p,p'-bis-ureidodiphenyl sulfone is 0.0005 to 0.5 percent by weight.

12. The composition of claim 10 in which the effective amount of p,p'-bis-ureidodiphenyl sulfone is 0.001 to 0.1 percent by weight.

* * * * *